United States Patent
Kobayashi et al.

(10) Patent No.: US 6,802,876 B1
(45) Date of Patent: Oct. 12, 2004

(54) APPARATUS FOR PRODUCING HYDROGEN

(75) Inventors: Kazuto Kobayashi, Tokyo (JP); Yoshimasa Fujimoto, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 883 days.

(21) Appl. No.: 09/588,903

(22) Filed: Jun. 9, 2000

(30) Foreign Application Priority Data

Jun. 9, 1999 (JP) .......................................... 11-162416

(51) Int. Cl.⁷ ................................................ B01J 8/00
(52) U.S. Cl. ...................... 48/127.9; 422/194; 422/198
(58) Field of Search .................. 422/190, 194, 422/198, 211; 48/127.9, 89, 198.1, 198.3, 198.7

(56) References Cited

U.S. PATENT DOCUMENTS

| 4,865,624 | A | * | 9/1989 | Okada ........................... 48/61 |
| 5,149,600 | A | | 9/1992 | Yamase et al. |
| 5,458,857 | A | * | 10/1995 | Collins et al. ............... 422/198 |
| 5,769,909 | A | * | 6/1998 | Bonk et al. ................. 48/127.9 |
| 5,938,800 | A | * | 8/1999 | Verrill et al. ............... 48/127.9 |
| 6,011,073 | A | * | 1/2000 | Agee et al. .................. 518/700 |
| 6,277,338 | B1 | * | 8/2001 | Agee et al. .................. 422/189 |
| 6,306,354 | B1 | * | 10/2001 | Szydlowski et al. ........ 422/200 |
| 6,348,278 | B1 | * | 2/2002 | LaPierre et al. .............. 429/17 |

FOREIGN PATENT DOCUMENTS

| EP | 0615949 A | 9/1994 |
| GB | 1572796 | 8/1980 |
| JP | 62-279264 A | 12/1987 |
| JP | 3-179672 A | 8/1991 |
| JP | 4325402 A | 11/1992 |
| JP | 6321503 A | 11/1994 |
| WO | 97/35805 A | 10/1997 |
| WO | 98/19960 A | 5/1998 |

* cited by examiner

Primary Examiner—Kiley Stoner
Assistant Examiner—Len Tran
(74) Attorney, Agent, or Firm—Birch, Stewart, Kolasch & Birch, LLP

(57) ABSTRACT

An apparatus for producing hydrogen by a steam reforming reaction, on a catalyst, of a hydrocarbon or an oxygen-containing hydrocarbon as a raw material is disclosed. The apparatus comprises a hydrogen separation type reformer which has a means for heating the catalyst and which has a hydrogen separation membrane built into a layer of the catalyst for selectively separating hydrogen; a cooling means for cooling high temperature high purity hydrogen obtained from the reformer; and a hydrogen charge/discharge means disposed downstream from the cooling means and composed of a hydrogen storage material.

2 Claims, 9 Drawing Sheets

APPARATUS FOR PRODUCING HYDROGEN

BACKGROUND OF THE INVENTION

1. Field of the Invention

The present invention relates to an apparatus for producing hydrogen by a steam reforming reaction using a hydrocarbon or an oxygen-containing hydrocarbon as a raw material.

2. Description of the Related Art

A conventional apparatus for producing hydrogen with the use of a hydrogen separation type reformer is proposed, for example, in Japanese Unexamined Patent Publication No. 4-325402. Disclosed in this proposal is an apparatus for producing hydrogen for a fuel cell with the use of a hydrogen separation type reformer from which hydrogen is withdrawn by a pressure reducing means. The concept of constitution of this apparatus is illustrated in FIG. 9.

As shown in FIG. 9, a hydrogen separation membrane 02 and a catalyst 08 are provided in a hydrogen separation type reformer 01. A gas as a raw material (hereinafter referred to as a raw material gas) 06 and steam 07 are fed to the hydrogen separation type reformer 01, where a reforming reaction takes place. Hydrogen formed by the reforming reaction is separated by the separation membrane 02. On a hydrogen permeation side 03 where the separated hydrogen permeates, a pressure reducing device 04 is provided to recover high purity hydrogen 05.

With the hydrogen separation type reformer 01, the raw material gas 06 comprising a hydrocarbon or an oxygen-containing hydrocarbon such as methane or methanol is introduced, and reformed on the catalyst 08 by a steam reforming reaction and a CO shift reaction to form hydrogen and carbon dioxide mainly. The hydrogen is selectively separated, for recovery, by the hydrogen separation membrane 02 built into the catalyst 08. As the hydrogen separation membrane 02, a non-porous thin film with a thickness as small as about several to 50 $\mu$m, which comprises a hydrogen-permeable metal film of Pd or Pd alloy, is used, as shown in Japanese Unexamined Patent Publication No. 6-321503. As the catalyst 08, a catalyst containing a group VIII metal (Fe, Co, Ni, Ru, Rh, Pd or Pt) is preferred, and a catalyst bearing Ni, Ru or Rh or an Nio-containing catalyst is particularly preferred.

A perspective sectional view of the structure of a typical hydrogen separation type reformer is shown in FIG. 7, and a cross sectional view of the structure is shown in FIG. 8. As shown in these drawings, a hydrogen separation type reformer 10 has an outer cylinder 14 with a closed bottom 12, and an intermediate cylinder 16 and an inner cylinder 18 disposed in this order inwardly of the outer cylinder 14. The outer cylinder 14, the intermediate cylinder 16, and the inner cylinder 18 are formed upright. At an upper part of a second annular space portion 26 between the intermediate cylinder 16 and the inner cylinder 18, a preliminary reforming portion 25 is provided. Below the preliminary reforming portion 25, a plurality of hydrogen permeable pipes 34 having a metal film selectively permeable to hydrogen are disposed concentrically with the second annular space portion 26.

A burner 46 burns a fuel gas, which has been introduced through a fuel gas pipe 48, with air taken in through an air intake pipe 50 to supply thermal energy necessary for a steam reforming reaction to the second annular space portion 26 filled with a reforming catalyst A, thereby keeping the catalyst at a predetermined temperature. The fuel gas passes through an inner tube hollow portion 22, a space between the bottom 12 of the outer cylinder 14 and an annular bottom portion 24, and a first annular space portion 20, and goes outside through a combustion gas outlet 52. During this motion, the fuel gas heats a layer of the catalyst filled into the second annular space portion 26.

A process feed gas comprising a gas mixture of steam and a raw material gas composed of a hydrocarbon or an oxygen-containing hydrocarbon, such as methane or methanol, is introduced through a feed gas inlet 54 provided at an upper part of the second annular space portion 26. The process feed gas is partially converted into hydrogen at the preliminary reforming portion 25, and flowed into the layer of the catalyst filled into the second annular space portion 26, whereby the process feed gas is converted into hydrogen at a high temperature. The resulting hydrogen is selectively separated and collected by the hydrogen permeable pipes 34, passed through a third space portion 33 and flowed out through a hydrogen outlet 56 provided above the third space portion 33. The unreacted raw material gas and the resulting CO and $CO_2$ gases, which have passed through the catalyst layer, flow through an off-gas pipe 60 having an opening at a lower part of the second annular space portion 26, and flow out of the system through an off-gas outlet 62.

With the foregoing conventional apparatus, the resulting hydrogen is withdrawn from the hydrogen separation type reformer 10 by a pressure reducing device. As is well known, a hydrogen separation membrane gives a necessary amount of hydrogen with high efficiency, accordingly, with a small membrane area, if the pressure of the hydrogen permeation side is minimized. Thus, a highly efficient pressure reducing device has been required. A vacuum pump or the like is conceivable as a pressure reducing device. However, such a rotary device has difficulty in efficiently delivering a light gas, such as hydrogen, thus requiring a high power. Furthermore, the aforementioned Japanese Unexamined Patent Publication No. 4-325402 does not propose a concrete apparatus layout including a pressure reducing device, and cannot actualize a feasible apparatus.

SUMMARY OF THE INVENTION

The present invention has been accomplished in light of these circumstances. It is an object of this invention to actualize such a concrete and feasible apparatus layout involving a pressure reducing device and provide an apparatus for producing hydrogen with the use a hydrogen separation type reformer, the apparatus having a minimal area required, and having improved durability while using a pressure reducing device.

A first aspect of the present invention, as a means of attaining the above object, is an apparatus for producing hydrogen by a steam reforming reaction, on a catalyst, of a hydrocarbon or an oxygen-containing hydrocarbon as a raw material, the apparatus comprising a hydrogen separation type reformer which has a means for heating the catalyst and which has a hydrogen separation membrane built into a layer of the catalyst for selectively separating hydrogen, a cooling means for cooling high temperature high purity hydrogen obtained from the reformer, and a hydrogen charge/discharge means disposed downstream from the cooling means and composed of a hydrogen storage material.

According to the first aspect of the invention, the following actions and effects are exhibited:

The high temperature high purity hydrogen that has been separated from the reformer is once cooled by the cooler, the indirect heat exchanger, to a temperature at which hydrogen is easily charged into the hydrogen storage material. Then, the cooled hydrogen is fed to the hydrogen storage material. As a result, the hydrogen charging rate and the amount of hydrogen charged are increased, and hydrogen can be withdrawn from the reformer at a lower pressure than the atmospheric pressure. Thus, the membrane area of the hydrogen separation can be decreased. Moreover, a required power can be decreased markedly in comparison with the power required for the use of a vacuum pump.

When hydrogen charged in the hydrogen storage material is to be delivered, the temperature of the hydrogen storage material is set at an appropriate level, whereby high pressure hydrogen can be obtained. Thus, a hydrogen compression power necessary when a compressor is used can be cut down markedly.

A second aspect of the invention is the apparatus for producing hydrogen as the first aspect of the invention, wherein the cooling means for cooling the high temperature high purity hydrogen comprises an indirect heat exchanger.

According to the second aspect of the invention, the sensible heat of the high temperature high purity hydrogen can be utilized for heating of the raw material gas and steam. Thus, the energy efficiency of the apparatus can be increased.

A third aspect of the invention is the apparatus for producing hydrogen as the first or second aspect of the invention, wherein a fluid for cooling the high temperature high purity hydrogen via the indirect heat exchanger is one or both of a raw material gas and combustion air to be fed to the hydrogen separation type reformer. As the raw material gas, a mixture of a hydrocarbon or an oxygen-containing hydrocarbon can be named.

According to the third aspect of the invention, it becomes unnecessary to use cooling water, separately, for heat exchange. Also, preheating increases the reforming efficiency, and can improve the thermal efficiency of the entire apparatus.

A fourth aspect of the invention is the apparatus for producing hydrogen as any one of the first to third aspects of the invention, wherein a fluid for cooling the high temperature high purity hydrogen via the indirect heat exchanger is one or both of air or cooling water.

According to the fourth aspect of the invention, the sensible heat of the high temperature high purity hydrogen can be recovered and utilized.

An A fifth aspect of the invention is the apparatus for producing hydrogen as any one of the first to fourth aspects of the invention, wherein the hydrogen charge/discharge means composed of the hydrogen storage material comprises at least two members of a hydrogen storing allay incorporating a heating/cooling means.

According to the fifth aspect of the invention, efficient occlusion of hydrogen can be performed.

A sixth aspect of the invention is the apparatus for producing hydrogen as the fifth aspect of the invention, wherein a fluid for cooling the high temperature high purity hydrogen via the indirect heat exchanger is cooling water, and hot water heated by heat exchange performed by the heat exchanger is used for heating of a hydrogen discharge means in the hydrogen charge/discharge means composed of the hydrogen storage material.

According to the sixth aspect of the invention, cooling water used to cool high temperature high purity hydrogen is utilized for heating the hydrogen storage material. Thus, effective use of heat can be achieved.

A seventh aspect of the invention is the apparatus for producing hydrogen as any one of the first to sixth aspects of the invention, wherein a pressure regulating means is interposed between the cooling means for cooling the high temperature high purity hydrogen and the hydrogen charge/discharge means disposed downstream from the cooling means and composed of the hydrogen storage material, to regulate the pressure of the high purity hydrogen to be fed to the hydrogen charge/discharge means.

According to the seventh aspect of the invention, the pressure regulator is installed between the hydrogen storage material and the cooling means. This prevents a rapid decrease in pressure on the hydrogen permeation side of the hydrogen separation membrane, thus improving the durability of the hydrogen separation membrane. Moreover, a rapid rise in the temperature of the hydrogen storage material associated with its hydrogen charge can also be prevented. Thermal shock to the hydrogen storage material can be lessened. Furthermore, changes over time in the amount of hydrogen production from the apparatus for producing hydrogen can be minimized and leveled off.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Embodiments of the present invention will now be described in detail with reference to the accompanying drawings, which in no way limit the invention.

First Embodiment

Figure 1:
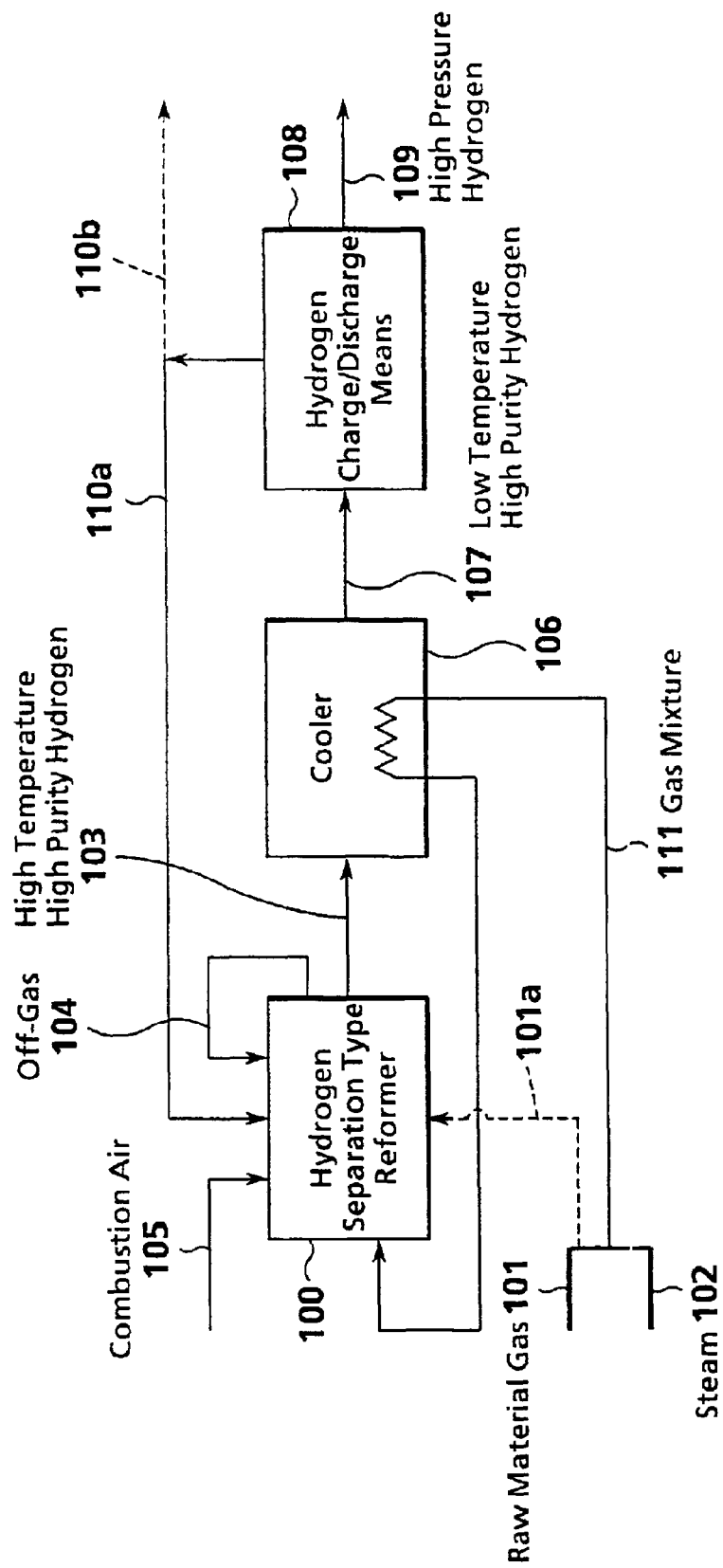
FIG. 1 is a schematic view of a first embodiment of the present invention.

FIG. 1 is a schematic view of an apparatus layout for implementing the present invention. As shown in FIG. 1, an apparatus for producing hydrogen according to the present embodiment is an apparatus for producing hydrogen by a steam reforming reaction, on a catalyst, of a hydrocarbon or an oxygen-containing hydrocarbon as a raw material, the apparatus comprising a hydrogen separation type reformer 100 which has a means for heating the catalyst and which has a hydrogen separation membrane built into a layer of the catalyst for selectively separating hydrogen, a cooler 106 for cooling high temperature high purity hydrogen obtained from the reformer 100, and a hydrogen charge/discharge means 108 disposed downstream from the cooler 106 and composed of a hydrogen storage material.

Figure 7:
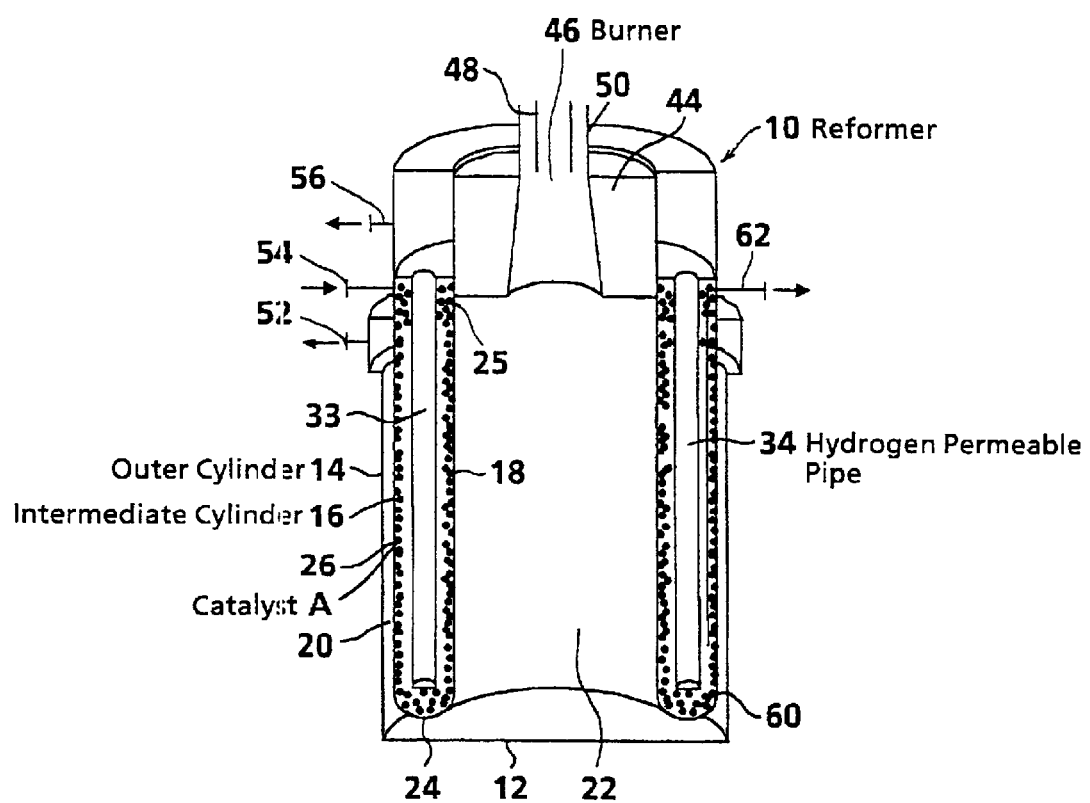
FIG. 7 is a perspective sectional view of an apparatus for producing hydrogen.
Figure 8:
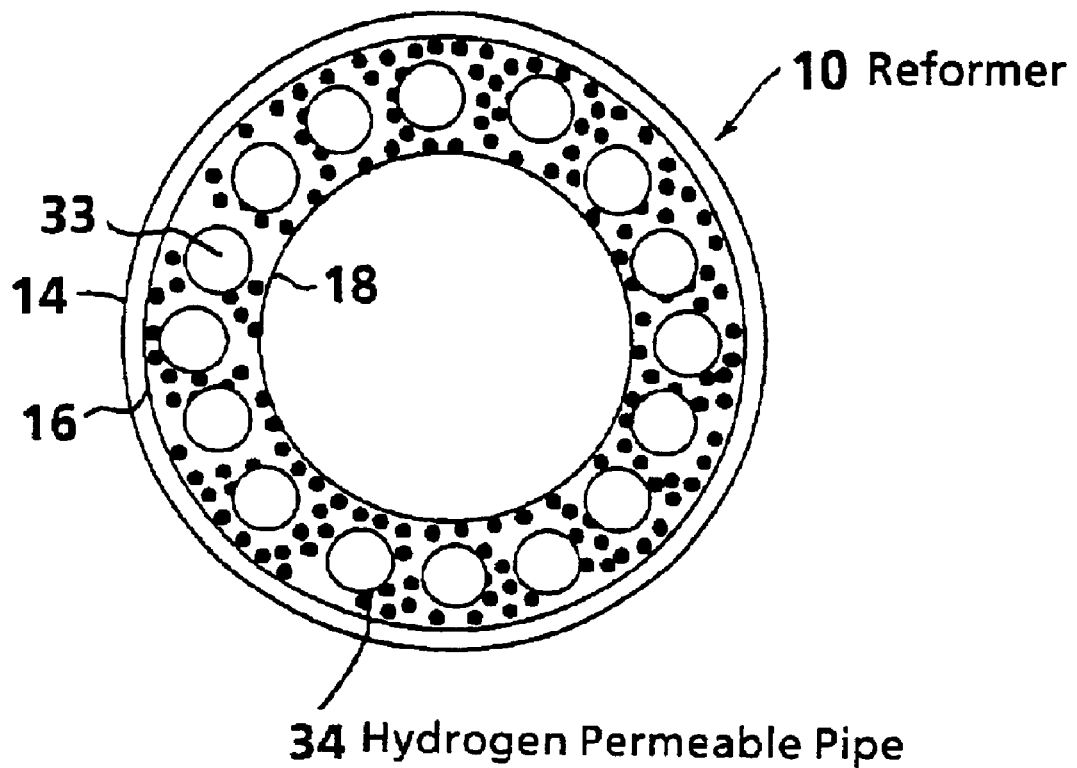
FIG. 8 is a schematic cross sectional view of the apparatus for producing hydrogen shown in FIG. 7.
Figure 9:
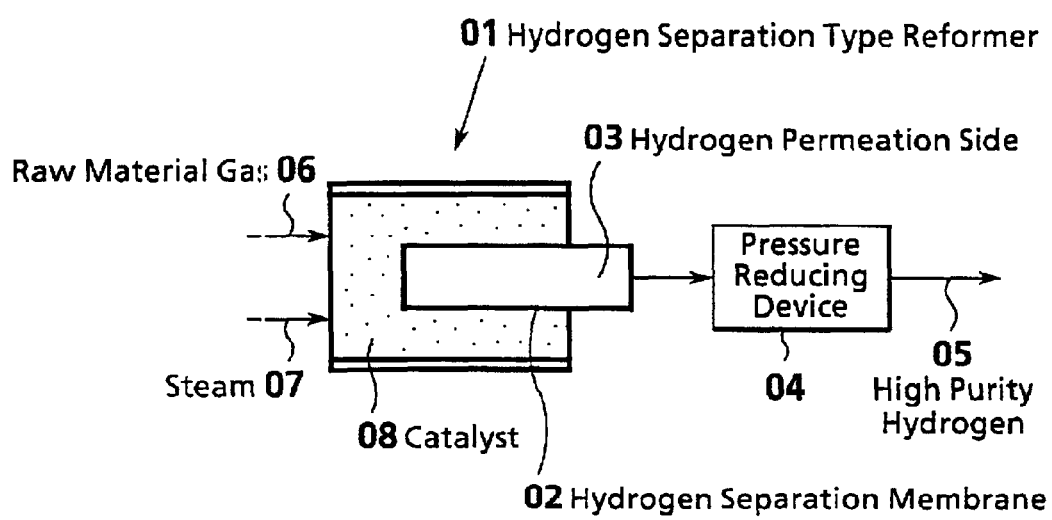
FIG. 9 is a schematic view of a conventional apparatus for producing hydrogen.

The hydrogen separation type reformer (hereinafter referred to as "reformer") 100 may be, but not restricted to, one having a structure as shown in FIGS. 7 and 8. In the following description, the same reference numerals as used in the apparatus shown in FIGS. 7 and 8 will be used, and overlapping explanations of the constitution of the apparatus will be omitted.

The reformer 100 is supplied with a raw material gas 101, which comprises a hydrocarbon or an oxygen-containing hydrocarbon such as methane or methanol, and steam 102. These materials are reformed mainly by a steam reforming reaction to form a mixed gas mainly composed of hydrogen, carbon monoxide and carbon dioxide. Hydrogen in this gas is selectively separated, and withdrawn from the reformer 100 as high temperature (400 to 550° C.) high purity hydrogen 103. The residual gas after separation of hydrogen is taken out of the Reformer 100 as an off-gas 104. The off-gas 104 is fed to a combustion side of the reformer 100, mixed with combustion air 105 in a burner of the reformer 100 (the burner 46 of the reformer shown in FIG. 7), and then subjected to combustion. Alternatively, the off-gas 104 may be mixed with a portion 101a of the raw material gas 101 supplied, and then may he used as fuel.

The high temperature high purity hydrogen 103 separated from the reformer 100 is cooled by the cooler 106 to become low temperature (30 to 200° C.) high purity hydrogen 107. This hydrogen 107 is stored in the hydrogen charge/discharge means 108 composed of a hydrogen storage material, and delivered from the hydrogen charge/discharge means 108 as high pressure hydrogen (2 atm or higher) 109. The low temperature high purity hydrogen 107 contains trace amounts of impurities such as carbon dioxide and carbon monoxide. Therefore, the low temperature high purity hydrogen 107 during charge or discharge is intermittently sent to the reformer 100 as purge hydrogen 110a for use as part of fuel. When the low temperature high purity hydrogen 107 is not sent to the reformer 100, it is purged out of the system as low purity hydrogen 110b.

In the cooler 106 of the present First Embodiment, a gas mixture 111 of the raw material gas 101 and steam 102 is heat exchanged with the high temperature high purity hydrogen 103 indirectly, and thereby preheated. The preheated gas mixture 111 is supplied to the reformer 100.

The hydrogen storage material of the hydrogen charge/discharge means 108 for carrying out the invention may be any material, without being restricted to the one disclosed in the embodiment, as long as it selectively stores hydrogen from the mixed gas containing hydrogen, and releases the stored hydrogen up)on heating. As a practical hydrogen storage material, a hydrogen storing alloy is known. Its examples are rare earth metal-Ni alloys such as $LaNi_5$, misch metal alloys, titanium-zirconium alloys such as TiFe, Mg alloys such as $Mg_2Ni$, V alloys, and calcium alloys such as $CaNi_5$. In the invention, the hydrogen storage material is not restricted to these alloys. Storage materials which store hydrogen, such as those composed of a carbon nanotube, are also usable.

As the indirect type heat exchanger for the cooler 106, an ordinary shell & tube type heat exchanger or an ordinary plate type heat exchanger can be used. Any type of heat exchanger, which can perform cooling without direct contact with the high temperature high purity hydrogen 103, can be used without its embodiment being restricted.

According to the present embodiment, the high temperature (400 to 550° C.) high purity hydrogen 103 that has been separated from the reformer 100 is once cooled by the cooler 106, the indirect heat exchanger, to a temperature of about 30 to 200° C. at which hydrogen is easily stored in the hydrogen storage material. Then, the cooled hydrogen is fed to the hydrogen charge/discharge means 108, the hydrogen storage material. As a result, the hydrogen charging rate and the amount of hydrogen charged can be increased. Also, hydrogen can be withdrawn from the reformer 100 at a lower pressure than the atmospheric pressure. Thus, the membrane area of the hydrogen separation membrane of the reformer 100 can be decreased. Moreover, a required power for the withdrawal of hydrogen can be decreased markedly in comparison with the power required when a vacuum pump is used.

When hydrogen charged in the hydrogen storage material is to be discharged, the temperature of the hydrogen charge/discharge means 108, the hydrogen storage material, is set at an appropriate level (e.g., about 80° C.), whereby hydrogen released at a high pressure can be obtained. Thus, a hydrogen compression power necessary when a compressor is used can be cut down markedly.

Besides, the sensible heat of the high temperature high purity hydrogen 103 reformed by the reformer 130 can be utilized for heating of the raw material gas and steam in the cooler 106. Thus, the energy efficiency of the entire apparatus can be increased.

Second Embodiment

Figure 2:
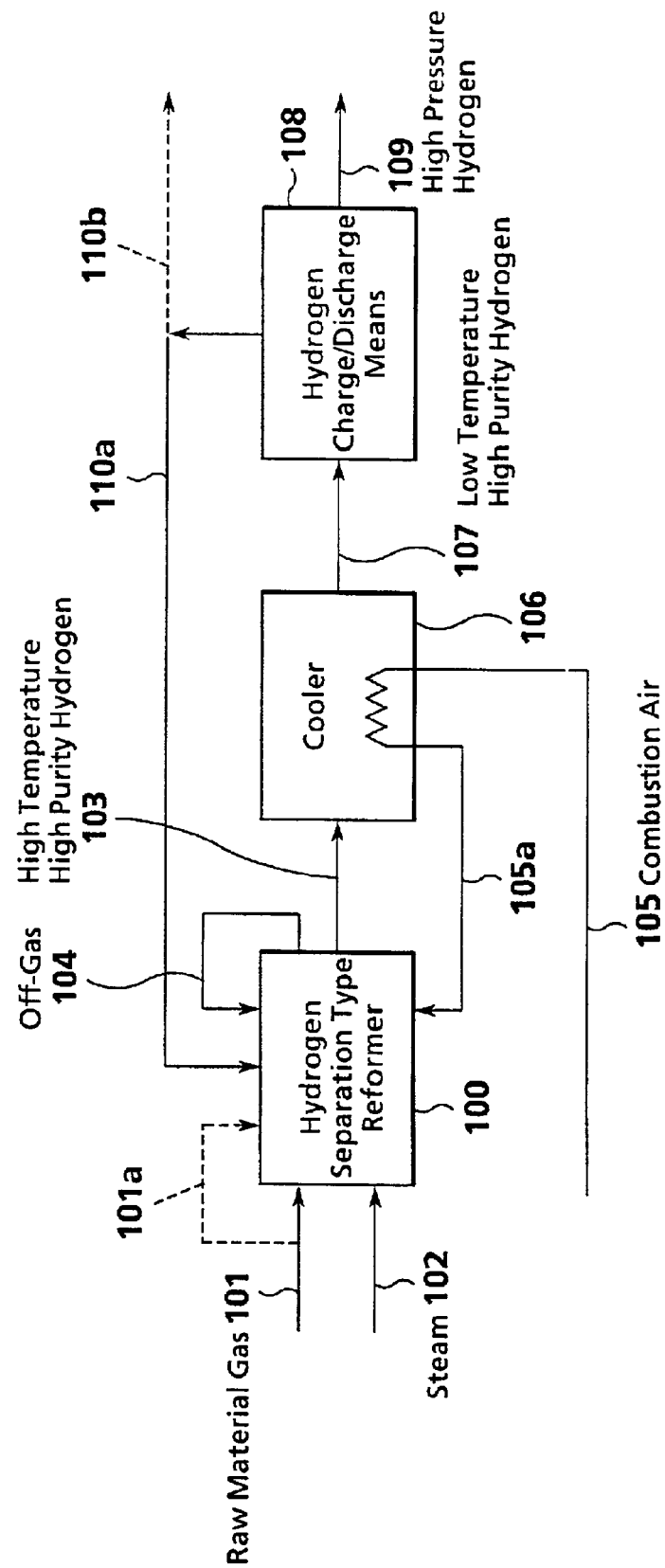
FIG. 2 is a schematic view of a second embodiment of the invention.

FIG. 2 is a schematic view of an apparatus layout for a second embodiment of the present invention.

According to the First Embodiment, the gas mixture 111 of the raw material gas 101 and steam 102 is fed to the cooler 106 for heat exchange, in order to utilize the sensible heat of the high temperature high purity hydrogen 103. In the present embodiment, on the other hand, combustion air 105 is supplied as shown in FIG. 2.

As the aforementioned cooler 106, an indirect type heat exchanger, for example, can be used. In the case of FIG. 2, heat exchange between the combustion air 105 and high temperature high purity hydrogen 103 takes place to cool the hydrogen, making it low temperature high purity hydrogen 107. Heated combustion air 105a after heating by heat exchange, on the other hand, is fed to a burner of a reformer 100 (the burner 46 of the reformer illustrated in FIG. 7).

In the embodiment shown in FIG. 2, as indicated above, the combustion air 105 is indirectly heat exchanged with the high temperature high purity hydrogen 103, and thereby preheated. The preheated combustion air is fed to the reformer 100, whereby the energy efficiency of the entire apparatus can be increased.

Third Embodiment

Figure 3:
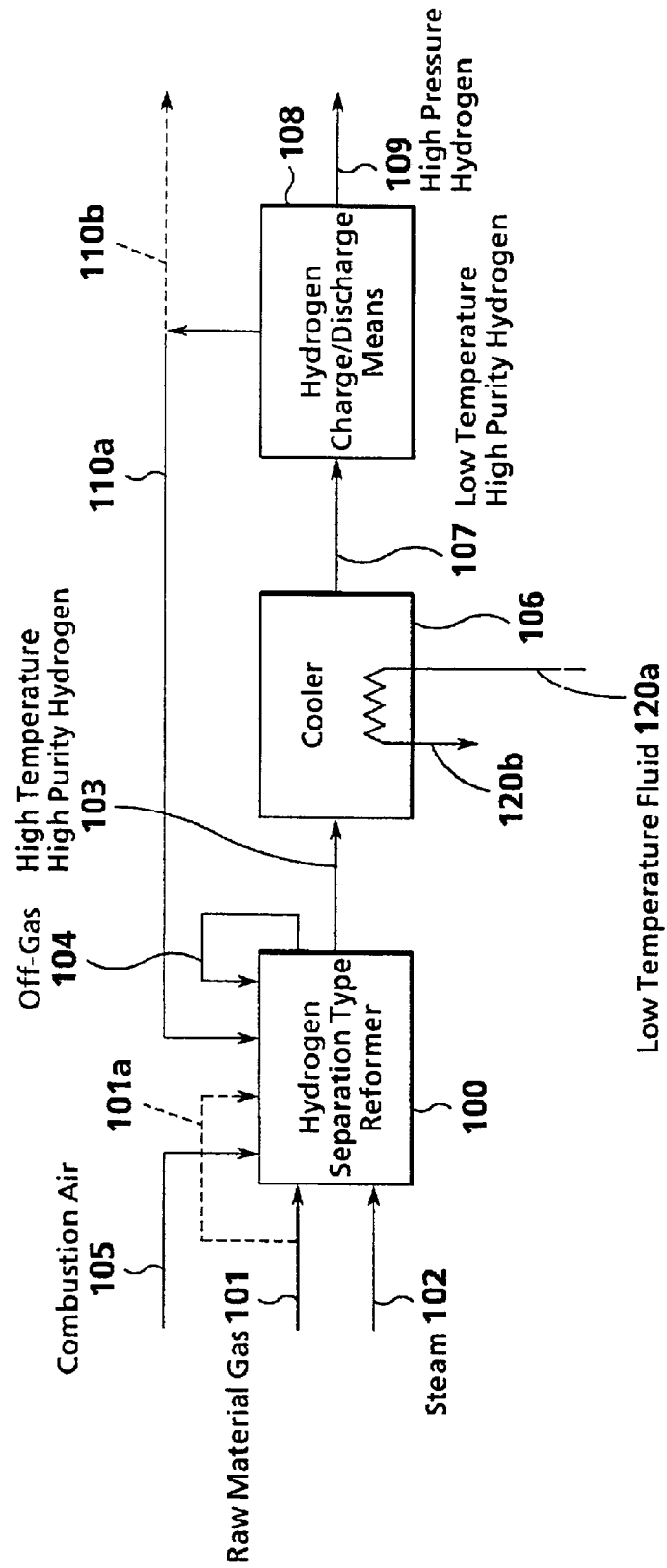
FIG. 3 is a schematic view of a third embodiment of the invention.

FIG. 3 shows a third embodiment of the invention. According to this embodiment, air or cooling water is fed to a cooler 106 as a low temperature fluid 120a, which is heat exchanged with high temperature high purity hydrogen 103 to obtain low temperature high purity hydrogen 107. A low temperature fluid 120b after heat exchange is discharged out of the system, and utilized as other heat sources.

Fourth Embodiment

Figure 4:
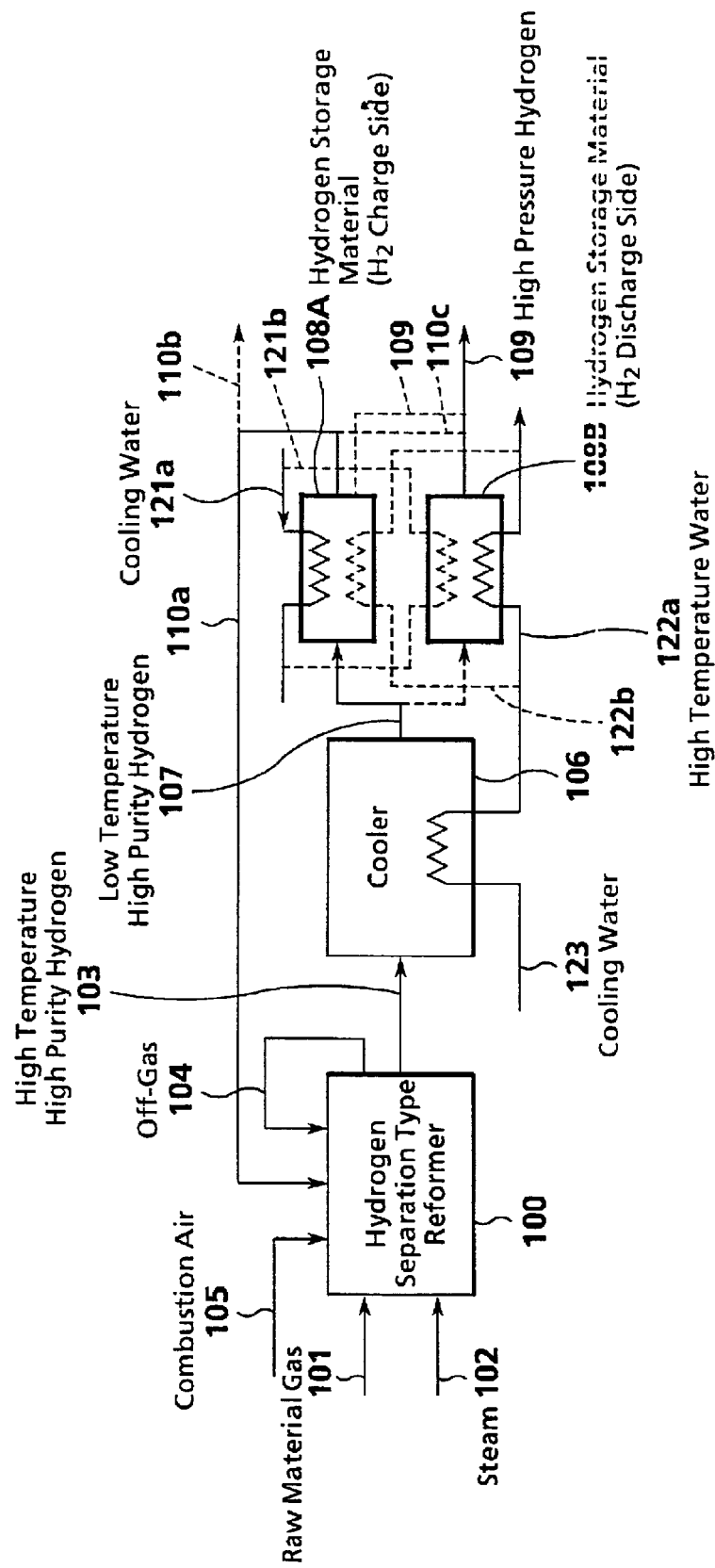
FIG. 4 is a schematic view of a fourth embodiment of the invention.

FIG. 4 shows a fourth embodiment of the invention. According to this embodiment, a hydrogen charge/discharge means is composed of two members, a hydrogen storage material 108A and a hydrogen storage material 108B. In FIG. 4, the hydrogen storage material 108A is defined as a hydrogen charge side, while a hydrogen storage material 108B is defined as a hydrogen discharge side.

In the hydrogen storage material 108A on the hydrogen charge side, low temperature high purity hydrogen 107 is flowed, and cooling water 121a is supplied to cool the entire hydrogen storage material 108A. By this measure, hydrogen is efficiently stored and charged. Also, low purity hydrogen 110b is intermittently purged, or sent to a reformer 100 as purge hydrogen 110a.

In the hydrogen storage material 108B on the hydrogen discharge side, on the other hand, the low temperature hydrogen 107 is not flowed. However, separately fed high temperature water (50 to 100° C.) 122a heats the entire alloy to release hydrogen stored in the hydrogen storing alloy, and the hydrogen is delivered out of the system as high pressure hydrogen 109.

In the hydrogen storage material 108A on the hydrogen supply side, at a time when hydrogen has been stored up to a set value for the amount of charge in the hydrogen storage material, the supply of the low temperature high purity hydrogen 107 and the supply of the cooling water 121a are stopped. Instead, high temperatures water 122b is flowed to liberate high pressure hydrogen 109.

At the same time, in the hydrogen storage material 108B on the hydrogen release side, the supply of the high temperature water 122a and the release of the high pressure hydrogen 109 are stopped. With cooling water 121b being flowed, low temperature high purity hydrogen 107 is supplied to have hydrogen stored.

By repeating the above procedures alternately, high pressure hydrogen 109 is delivered. On this occasion, low purity hydrogen 110c present in the hydrogen storage material 108B on the hydrogen delivery side can be discharged intermittently.

As the high temperature water 122a, 122b fed for hydrogen release, it is permissible to use waste heat of cooling water 123 that has been fed to a cooler 106 for cooling high temperature high purity hydrogen 103, in order to utilize the thermal energy within the apparatus efficiently.

According to the present embodiment, the waste heat of the cooling water 123 used for cooling of the high temperature high purity hydrogen 103 is utilized for heating of the hydrogen storage material 108B on the hydrogen delivery side, whereby effective use of heat can be achieved.

Fifth Embodiment

Figure 5:
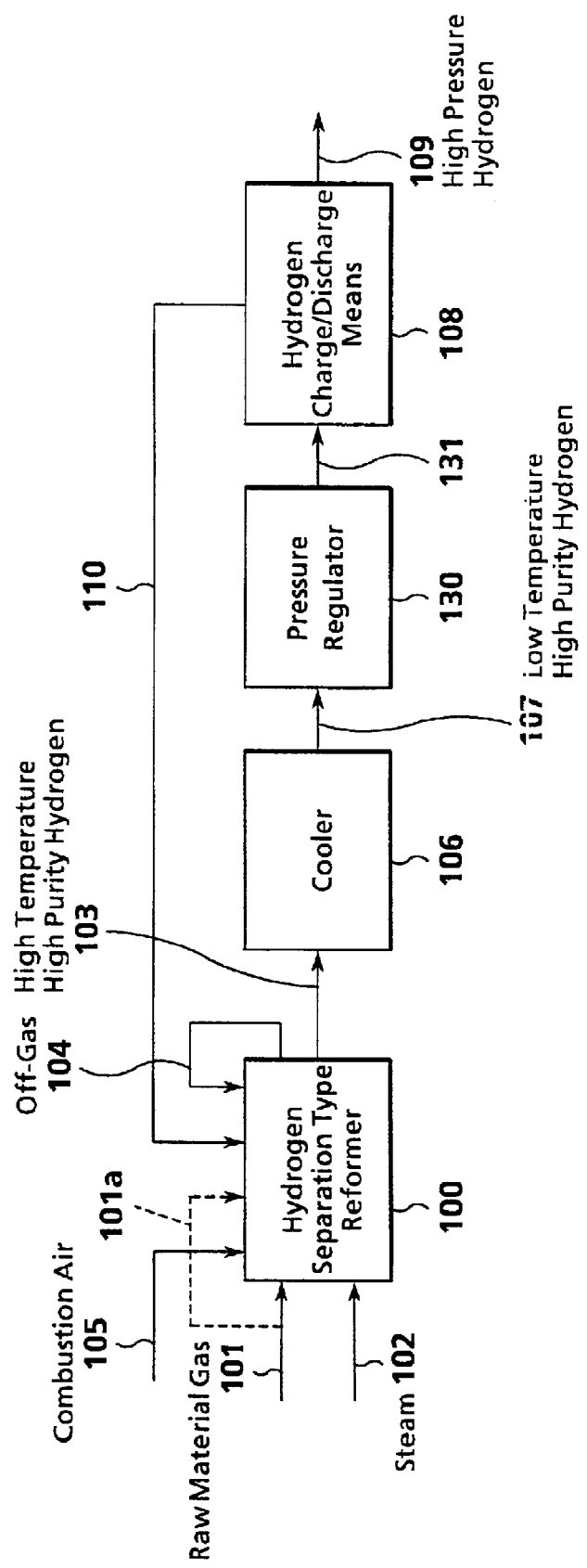
FIG. 5 is a schematic view of a fifth embodiment of the invention.

FIG. 5 shows a fifth embodiment of the invention. According to this embodiment, a pressure regulator 130 for low temperature high purity hydrogen 107 is installed between a cooler 106 and a hydrogen charge/discharge means 108. As the pressure regulator 130, an ordinary valve can be used, and a valve involving a decreased loss in pressure is preferred. High purity hydrogen 131 after pressure regulation is fed to the hydrogen charge/discharge means 108.

According to the present embodiment, the pressure regulator 130 is installed between the hydrogen charge/discharge means 108 and the cooler 106. As a result, a buffer zone is formed for preventing a rapid pressure drop on the hydrogen permeation side of a hydrogen separation membrane inside a reformer 100. Consequently, the durability of the hydrogen separation membrane can be improved. Moreover, a rapid rise in the temperature of the hydrogen charge/discharge means 108 associated with its hydrogen charge can also be prevented. Thermal shock to the hydrogen charge/discharge means 108 can be cushioned. Furthermore, changes over time in the amount of hydrogen production from the apparatus for producing hydrogen can be minimized and leveled off. After all, well balanced hydrogen production can be performed.

EXAMPLES

The present invention will be described in further detail with reference to Examples, which are not limitative of the invention.

Example 1

A first example of the invention will be explained based on the apparatus layout shown in FIG. 3. A hydrogen separation type reformer 100 had the structure shown in FIGS. 7 and 8, as with the preceding Embodiments. A heat exchanger, a cooler 106, was of a plate fin type, and used cooling water as a low temperature fluid 120a to cool high temperature high purity hydrogen 103. A hydrogen storage material of a hydrogen charge/discharge means 108 was composed of two members of a hydrogen storing alloy of $LaNi_5$.

Hydrogen was produced under the following concrete conditions in accordance with the flow shown in FIG. 3.
(1) Hydrogen Separation Type Reform (100)

Example 1

① Main Constitution

The catalyst of the reformer 100 was an NiO catalyst in particle form, and the hydrogen separation membrane was made of a Pd alloy. The membrane area was 0.68 $m^2$.

② Operating Conditions

The reaction temperature of the reformer was 550° C., and the reaction pressure was 6 atm. Methane was used as the raw material gas. The reformer was run, with the flow rate of the raw material gas being 1.5 $m^3$ N/h and the steam-carbon ratio being 3.
(2) Cooler (106)

The heat exchanger, the cooler 106, was of a plate fin type, and used cooling water as a cooling medium. The inlet temperature of cooling water was 25° C., and the outlet temperature of cooling water was 80° C. The inlet temperature of the high temperature high purity hydrogen 103 fed to the cooler 106 was 450° C., and the outlet temperature of low temperature high purity hydrogen 107 after heat exchange was 40° C.
(3) Hydrogen Charge/Discharge Means (108)

The hydrogen storage material, the hydrogen charge/discharge means 108, was composed of two members of an $LaNi_5$ alloy. The inlet temperature of cooling water during occlusion by the hydrogen storing alloy was 30° C., while the inlet temperature of cooling water during release of hydrogen was 80° C. The occluding capacity of the hydrogen storing alloy was 4 $m^3$ N/member.
(4) Amount of Hydrogen Production The amount of hydrogen production through the use of the hydrogen storing alloy as in the present Example was 3.0 $m^3$ N/h. Whereas the amount of hydrogen production without the use of the hydrogen storing alloy in the present Example was about a half, i.e., 1.5 $m^3$ N/h.
(5) Power for Hydrogen Supply In the present Example, the power required for supply of 3.0 $m^3$ N/h of hydrogen at 6 atm by the hydrogen storing alloy was about 0.05 kW. Whereas the power required for compression of 3.0 m³ N/h of hydrogen from 1 atm to 6 atm by a compressor was about 0.9 kW.

Example 2

A second example of the invention will be explained based on the apparatus layout shown in FIG. 3.
(1) Hydrogen Separation Type Reformer (100)
The a constitution and operating conditions were the same as in Example 1.
(2) Cooler (106)
The same constitution and operating conditions as in Example 1 were adopted, except that the outlet temperature of low temperature high purity hydrogen 107 in the cooler 106 was 80° C.
(3) Hydrogen Storing Alloy
The same constitution and operating conditions as in Example 1 were adopted.
(4) Amount of Hydrogen Production
When the high purity hydrogen outlet temperature was 40° C. as in Example 1, the amount of hydrogen production was 3.0 m³ N/h. When the high purity hydrogen outlet temperature was 80° C., on the other hand, the amount of hydrogen production was 2.0 m³ N/h.

Example 3

A third example of the invention will be explained based on the apparatus layout shown in FIG. 5.

A hydrogen separation type reformer 100, a cooler 106, and a hydrogen charge/discharge means 108 had the same constitutions as in Example 1. A pressure regulator 130 comprises a pressure regulating valve, and mitigates a rapid pressure fall at the start of hydrogen occlusion by the hydrogen charge/discharge means 108. Thus, the pressure regulator 130 curbs a rapid pressure change of low temperature high purity hydrogen 107 flowing out of the cooler 106.

Hydrogen was produced under the following concrete conditions:

The constitutions and operating conditions of the hydrogen separation type reformer 100, cooler 106, and hydrogen charge/discharge means 108 were the same as in Example 1.

Figure 6:
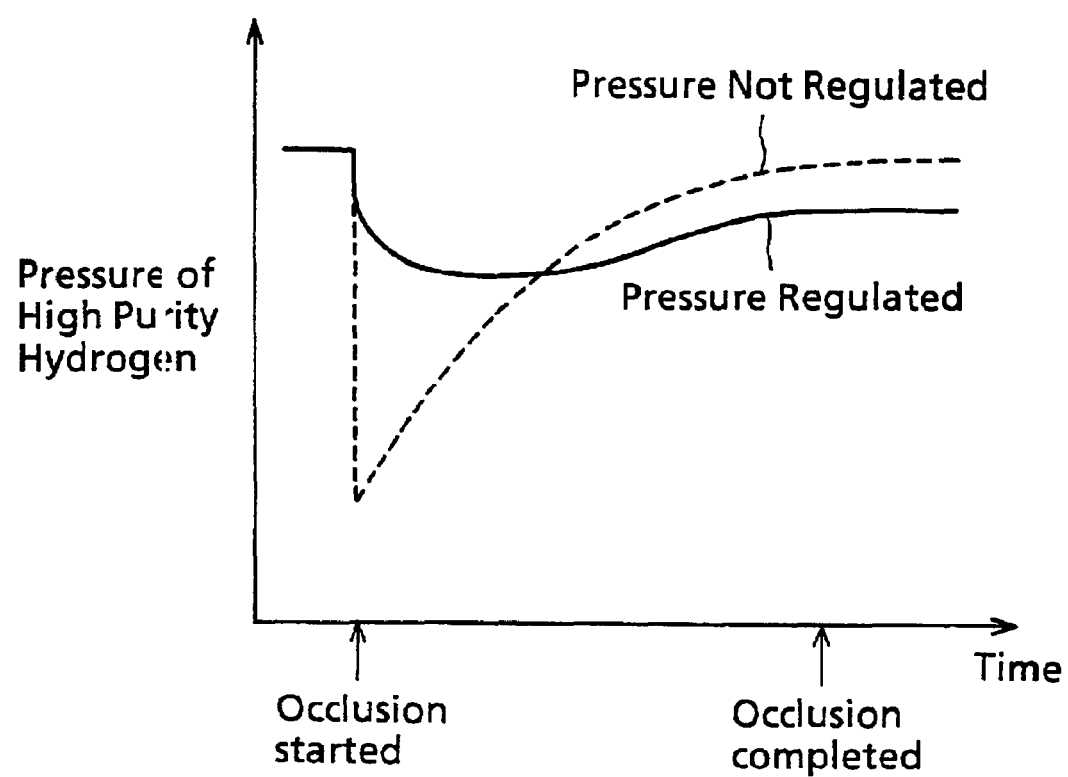
FIG. 6 is a graph of changes in the pressure of low temperature high purity hydrogen during hydrogen occlusion.

FIG. 6 shows changes in the pressure of low temperature high purity hydrogen during hydrogen occlusion. Regulation of the pressure results in the mitigation of a rapid pressure drop occurring at the start of occlusion.

The amount of hydrogen production was 3.5 m³ N/h when the pressure regulator 130 was installed. Whereas the amount of hydrogen production was 3.0 m³ N/h when the pressure regulator was not used.

The entire disclosure of Japanese Patent Application No. 11-162416 filed on Jun. 9, 1999, including specification, claims, drawings and summary, is incorporated herein by reference in its entirety.

What is claimed is:

1. An apparatus for producing hydrogen by a steam reforming reaction, on a catalyst, of a hydrocarbon or an oxygen-containing hydrocarbon as a raw material, comprising:

a hydrogen separation type reformer which has a means for heating the catalyst and which has a hydrogen separation membrane built into a layer of the catalyst for selectively separating hydrogen;

a cooling means for cooling high temperature high purity hydrogen obtained from the reformer; and hydrogen charge/discharge means disposed downstream from the cooling means and composed of a hydrogen storage material, wherein:

the cooling means for cooling the high temperature high purity hydrogen comprises an indirect heat exchanger, wherein:

the hydrogen charge/discharge means composed of the hydrogen storage material comprises at least two members of a hydrogen storing alloy incorporating a heating/cooling means, and wherein:

a fluid for cooling the high temperature high purity hydrogen via the indirect heat exchanger is cooling water; and hot water heated by heat exchange performed by the heat exchanger is used for heating of a hydrogen delivery means in the hydrogen charge/discharge means composed of the hydrogen storage material.

2. The apparatus for producing hydrogen as claimed in claim 1, wherein:

a pressure regulating means is interposed between the cooling means for cooling the high temperature high purity hydrogen and the hydrogen charge/discharge means disposed downstream from the cooling means composed of the hydrogen storage material, to regulate the pressure of the high purity hydrogen to be fed to the hydrogen charge/discharge means.

* * * * *